United States Patent [19]

Kawasaki et al.

[11] 4,289,160
[45] Sep. 15, 1981

[54] PRESSURE CONTROL VALVE

[75] Inventors: Haruhiko Kawasaki, Sagamihara; Hideshi Koiwai, Toda; Shizuo Matsumura, Konosu, all of Japan

[73] Assignee: Kayaba Kogyo Kabushiki Kaisha, Tokyo, Japan

[21] Appl. No.: 121,609

[22] Filed: Feb. 14, 1980

[30] Foreign Application Priority Data

Feb. 20, 1979 [JP] Japan .................................. 54-19567

[51] Int. Cl.³ .............................................. F16K 17/18
[52] U.S. Cl. ....................................... 137/491; 137/493
[58] Field of Search ............... 137/491, 492, 488, 493, 137/493.1, 493.2

[56] References Cited

U.S. PATENT DOCUMENTS

| | | | |
|---|---|---|---|
| 2,898,072 | 6/1961 | Banker | 137/491 |
| 3,100,503 | 8/1963 | Tennis | 137/491 |
| 3,164,166 | 1/1965 | Tennis | 137/491 |
| 4,089,344 | 5/1978 | Flaschar | 137/493 X |

Primary Examiner—Alan Cohan
Attorney, Agent, or Firm—David G. Alexander

[57] ABSTRACT

A pilot poppet (44) is unseated when a pressure in a back pressure chamber (39) exceeds a spring (47) preload force to communicate the back pressure chamber (39) with a relief port (33). The pressure in a pressure port (32) is communicated to the back pressure chamber (39) through a tubular piston poppet (37) which extends through a relief poppet (31). The relief poppet (31) is unseated by a pressure difference between the back pressure chamber (39) and the pressure port (32) to communicate the pressure port (32) with the relief port (33) since communication of the back pressure chamber (39) with the relief port (33) causes the pressure in the back pressure chamber (39) to drop. The piston poppet (37) is moved to engage the pilot poppet (44) and block communication between the pressure port (32) and the back pressure chamber (39), thereby causing the pressure in the back pressure chamber (39) to drop further. The pilot poppet (44) seats when the pressure in the back pressure chamber (39) drops below the biasing force on the pilot poppet (44) which is equal to a spring (47) preload force minus the net force on the piston poppet (37). The piston poppet (37) unseats from the pilot poppet (44) causing the relief poppet (31) to seat when the pressure in the pressure port (32) drops below the pressure in the back pressure chamber (39). The pressure receiving area (AR) of the piston poppet (37) is made as small as possible to reduce the net force on the pilot poppet (44) and thereby the pressure drop in the pressure port (32). The ratio of a pressure receiving area (AP) of the pilot poppet (44) to the pressure receiving area (AR) of the piston poppet (37) is at least 1.1.

5 Claims, 14 Drawing Figures

PRESSURE CONTROL VALVE

BACKGROUND OF THE INVENTION

The present invention relates to a pressure control valve for a hydraulic actuator system or the like.

Pressure relief valves are widely used in the art for limiting hydraulic oil pressure to a predetermined maximum value. There are generally two types. A first type comprises a spring loaded relief poppet which is unseated to connect a pressure line to a return line when the pressure in the pressure line exceeds the predetermined value. A second type is similar to the first type but further comprises a pilot poppet to amplify the pressure variation and control the relief poppet with greatly improved accuracy.

However, a problem has remained unsolved in the design of such valves, the closest known prior art being constituted by U.S. Pat. No. 3,164,166, in that the relief poppet opens too much, causing the pressure to undershoot the predetermined value by a large amount before stabilization and disrupt the hydraulic control system which is regulated by the control valve.

SUMMARY OF THE INVENTION

A pressure control valve embodying the present invention includes a housing defining a pressure port, a relief port and a back pressure chamber, a relief poppet biased to block communication between the pressure port and the relief port, a first end of the relief poppet communicating with the pressure port and a second end of the relief poppet communicating with the back pressure chamber, a piston poppet formed with a bore and slidably extending through the relief poppet, and a pilot poppet biased to block communication between the back pressure chamber and the relief port, the pilot poppet being moved when pressure in the back pressure chamber is above a biasing force to unblock communication between the back pressure chamber and the relief port, the piston poppet being moved by a pressure difference between the pressure port and the back pressure chamber to abut against the pilot poppet and seal the bore, the relief poppet being moved by said pressure difference to unblock communication between the pressure port and the relief port, the pressure control valve being characterized in that $A_P/A_R \geq 1.1$ where $A_R$ is an area of the piston poppet exposed to pressure in the pressure port and $A_P$ is an area of the pilot poppet exposed to pressure in the back pressure chamber.

In accordance with the present invention, a pilot poppet is unseated when a pressure in a back pressure chamber exceeds a spring preload force to communicate the back pressure chamber with a relief port. The pressure in a pressure port is communicated to the back pressure chamber through a tubular piston poppet which extends through a relief poppet. The relief poppet is unseated by a pressure difference between the back pressure chamber and the pressure port to communicate the pressure port with the relief port since communication of the back pressure chamber with the relief port causes the pressure in the back pressure chamber to drop. The piston poppet is moved to engage the pilot poppet and block communication between hte pressure port and the back pressure chamber, thereby causing the pressure in the back pressure to drop further. The pilot poppet seats when the pressure in the back pressure chamber drops below the biasing force on the pilot poppet which is equal to a spring preload force minus the net force on the piston poppet. The piston poppet unseats from the pilot poppet causing the relief poppet to seat when the pressure in the pressure port drops below the pressure in the back pressure chamber. The pressure receiving area of the piston poppet is made as small as possible to reduce the net force on the pilot poppet and thereby the pressure drop in the pressure port. The ratio of the pressure receiving area of the pilot poppet to the pressure receiving area of the piston poppet is at least 1.1.

It is an object of the present invention to provide an improved control valve which overcomes the drawbacks of the prior art and eliminates undershooting of a desired control pressure.

It is another object of the present invention to provide a control valve which performs more accurate control than has been possible in the prior art.

It is another object of the present invention to provide a control valve which enables stabilization to a desired pressure in a reduced period of time compared to the prior art.

It is another object of the present invention to provide a generally improved pressure control valve.

Other objects, together with the foregoing, are attained in the embodiment described in the following description and illustrated in the accompanying drawing.

DESCRIPTION OF THE PREFERRED EMBODIMENT

While the pressure control valve of the present invention is susceptible of numerous physical embodiments, depending upon the environment and requirements of use, substantial numbers of the herein shown and described embodiment have been made, tested and used, and all have performed in an eminently satisfactory manner.

Figure 1:
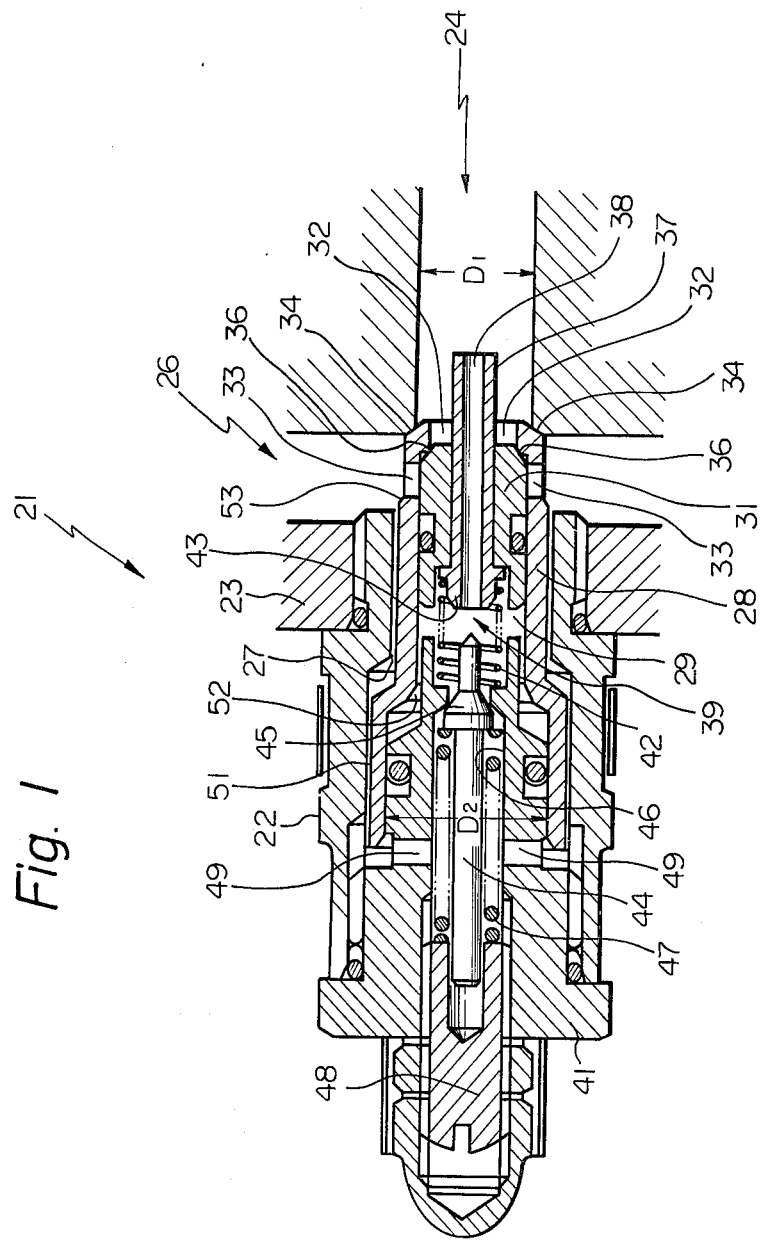
FIG. 1 is a sectional view of a pressure control valve embodying the present invention.
Figure 2:
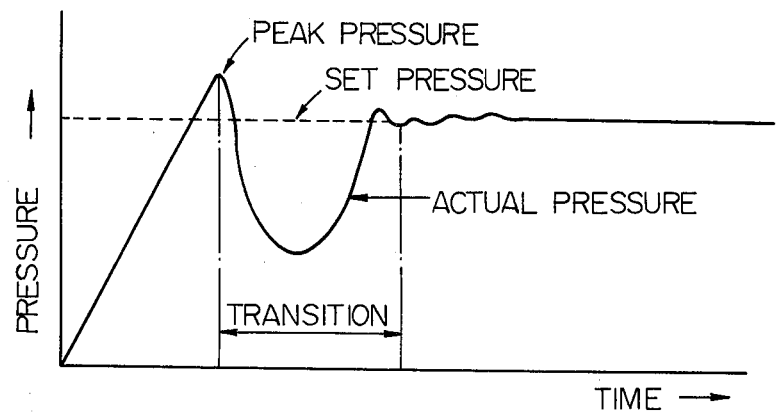
FIG. 2 is a graph illustrating the operation of a prior art pressure control valve.
Figure 3:
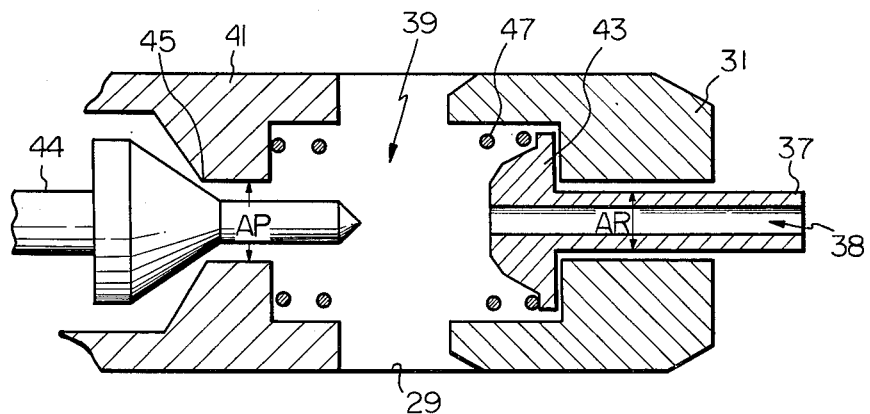
FIG. 3 is an enlarged, fragmentary sectional view illustrating the improved pressure control valve embodying the present invention.

Referring now to FIGS. 1 to 3 of the drawing, a pressure control valve embodying the present invention is generally designated by the reference numeral 21 and comprises a housing 22. The housing 22 is screwed into a threaded hole formed in a block 23. The block 23 may be part of a hydraulic control system such as for a construction vehicle (not shown) and is provided with a pressure passageway 24 leading to a high pressure source and a relief passageway 26 leading to a reservoir, although these elements are not shown. The purpose of the valve 21 is to maintain the fluid pressure in the passageway 24 below a predetermined value. Where the source is adapted to constantly supply fluid at a pressure above the predetermined value, the purpose of the valve 21 is to maintain the pressure at the predetermined value by connecting the pressure passageway 24 to the relief passageway 26 when the pressure exceeds the predetermined value and thereby bypass fluid from the passageway 24 to the passageway 26 and reduce the pressure in the passageway 24.

The housing 22 is formed with a bore 27 in which a check poppet 28 is slidably movable. The check poppet 28 is also formed with a bore 29 in which a relief poppet 31 is slidably movable. The right end of the check poppet 28 is open to the pressure in the passageway 24 and constitutes a pressure port 32. Radial holes 33 are formed in the check poppet 28 which communicate with the passageway 26 and constitute relief ports. Normally, the check poppet 28 seats on the block 23 as indicated at 34 in a sealing manner. The relief poppet 31 is also biased to seat on the check poppet 28 as indicated at 36 to block communication between the ports 32 and 33. Thus, communication between the passageways 24 and 26 is also blocked.

A tubular piston poppet 37 slidably extends through a hole formed in the relief poppet 31, the piston poppet 37 defining a bore 38. The piston poppet 37 communicates the pressure port 24 with a back pressure chamber 39 constituted by part of the bore 29. A valve body 41 is screwed into the housing 22. A compression spring 42 is seated on the right end portion of the valve body 41 and urges the piston poppet 37 rightwardly so that a seat portion 43 thereof abuts against the relief poppet 31.

A pilot poppet 44 is slidably disposed in a bore 46 in the body 41 and urged to seat against a seat portion 45 of the body 41 by a compression spring 47. Unseating of the poppet 44 enables the back pressure chamber 39 to communicate with the bore 46. A set screw 48 is provided for manual adjustment of the preload of the spring 47. The bore 46 communicates with the relief passageway 26 through radial passageways 49 and a clearance 51 between the housing 22 and the check poppet 28.

When the pressure in the passageway 24 is below the predetermined maximum value, the pressure in the back pressure chamber 39 is the same as the pressure in the passageway 24 due to communication through the bore 38 of the piston poppet 37. The relief poppet 31 and check poppet 28 are biased to their rightmost seating positions due to the configuration of the relief poppet 31. More specifically, the pressure receiving area of the left end of the poppet 31 is greater than the pressure receiving area of the right end thereof, thereby creating a pressure difference which urges the poppets 28 and 31 rightwardly. The pilot poppet 44 is seated due to the preload force of the spring 47 which overcomes the pressure in the back pressure chamber 39.

When the pressure in the passageway 24 and chamber 39 exceeds the predetermined value, the pilot poppet 44 is unseated to communicate the back pressure chamber 39 with the relief passageway 26 through the bore 46, passageways 49 and clearance 51. This causes the pressure in the chamber 39 to drop and create a pressure difference acting on the piston poppet 37 which causes the piston poppet 37 to move leftwardly and seat on the pilot poppet 44. This blocks the bore 38 and thereby blocks communication between the pressure passageway 24 and the back pressure chamber 39. This causes the pressure in the chamber 39 to decrease at a much higher rate.

As a result of the decreasing pressure in the chamber 39, the pilot poppet 44 will seat when the pressure in the chamber 39 drops to a level so as to balance the biasing force of the spring 47 and, as will become clear from further description, the piston poppet 37. This has the effect of trapping fluid at a relatively low pressure in the back pressure chamber 39.

Meanwhile, the pressure in the passageway 24 is still high, and the pressure difference between the passageway 24 and chamber 39 causes the relief poppet 31 to move leftwardly off the seat 36 and communicate the passageway 24 with the passageway 26 through the ports 32 and 33. This causes the pressure in the passageway 24 to drop due to fluid flow into the relief passageway 26. When the pressure in the passageway 24 drops slightly below the pressure in the chamber 39, there is a net force on the piston poppet 37 causing the same to unseat from the pilot poppet 44 and move rightwardly. This communicates the back pressure chamber 39 with the pressure passageway 24 causing an increase in pressure in the back pressure chamber 39. This causes the relief poppet 31 to move rightwardly and seat on the seat 36, thereby blocking communication between the passageways 24 and 26. The original conditions described above prevail after the conclusion of the pressure relief action.

The check poppet 28 is designed to communicate the passageways 24 and 26 when the pressure in the passageway 24 drops below a second predetermined value which is lower than the pressure relief valve. The second predetermined value may be such that the pressure in the passageway 24 drops below the pressure in the passageway 26. This can occur due to cavitation or other void formation conditions in the passageway 24.

The check poppet 28 is normally held engaged with the seat 34 since a diameter D2 at a left end portion thereof which is exposed to pressure in the chamber 39 through a clearance 52 is larger than a diameter D1 exposed to pressure in the passageway 24. However, the check poppet 28 is formed with a shoulder 53 exposed to pressure in the relief passageway 26 which is at a relatively low supply pressure. When the pressure in the passageway 24 drops below the pressure in the passageway 26, the pressure acting leftwardly on the shoulder 53 urges the check poppet 28 off the seat 34 to allow fluid from the passageway 26 to flow into the passageway 24.

FIG. 2 illustrates a problem which has existed heretofore in the prior art. As shown, the pressure in the passageway 24 initially exceeds the set pressure which is the predetermined maximum relief pressure and corresponds to the preload of the spring 47. However, during a transition period the pressure drops well below the set pressure before stabilizing. This is due to the fact that the piston poppet 37 exerts a leftward force on the pilot poppet 44 when the piston poppet 37 engages the pilot poppet 44 to block the bore 38. In the prior art, an area AP of the pilot poppet 44 which is exposed to pressure in the back pressure chamber 39 is equal to an area AR of the piston poppet 37 which is exposed to pressure in the passageway 24 and also to reverse pressure in chamber 39. The net force on the piston poppet 37 is in the leftward direction, opposite to the force of the spring 47. This has the effect of reducing the biasing force on the pilot poppet 44, causing it to seat at a pressure in the chamber 39 which is substantially lower than the set pressure. This is what causes the pressure undershoot in the transition region illustrated in FIG. 2. The larger the area AR, the greater the undershoot since the net force on the piston poppet 37 is greater. It is desirable to make the area AR as small as possible. Experiments by the present inventors have indicated that satisfactory performance will be obtained when the valve 21 is designed such that $A_P/A_R \geq 1.1$.

In the present type of pressure control valve 21, large fluctuation is observed in the set pressure immediately after opening of the relief poppet 31 as shown in FIG. 2, and the pressure waveform drops drastically after the peak pressure. According to experiments, this pressure drop is not constant but exhibits great fluctuation and tends to be extremely unstable.

According to investigation made by the present inventors, the cause may be ascribed to the following fact. Since the pressure change (drop) is too rapid in the back pressure chamber 39 immediately after the piston poppet 37 is moved and seated on the pilot poppet 44, the relief poppet 31 opens too much.

In order to restrict the pressure drop in the back pressure chamber 39, the present invention sets the ratio of the sectional area $A_R$ of the piston poppet 37 to the area $A_P$ of the pilot poppet 44 so as to satisfy the relation $$A_P/A_R \geq 1.1$$

By use of the above arrangement, the present invention contemplates to improve the transient characteristics and stability of pressure control immediately after unseating of the relief poppet 31.

As shown in FIG. 3, the present invention selects a diameter $D_R$ of the piston poppet 37 and a diameter $D_P$ of the seat 45 so that the area $A_P$ of the seat 45 for the pilot poppet 44 is greater than the sectional area $A_R$ of the piston poppet 37 so as to satisfy the relationship $A_P/A_R \geq 1.1$. Next, the reason for the use of such a construction and the results of the construction will be explained in comparison with those of a conventional valve.

For ease of explanation, the following symbols are employed to represent the constituent portions of the valve 21 of the present invention and a conventional valve having similar components.

$A'_R$: Sectional area of the piston poppet of a conventional valve $A_R$: Sectional area of the piston poppet 37 of the present valve 21

$A_B$: Sectional area of the bore 38

$A_P$: Area of the seat 35 for the pilot poppet 44

$P_{1-i}$: Pressure in the passageway 24 for each state (i=1, 2, 3)

$P_{2-i}$: Pressure inside the back pressure chamber 39 for each state (i=1, 2, 3)

$F'_{p-i}$: Force acting leftwardly to open the pilot poppet for each state of a conventional valve (i=1, 2, 3)

$F_{p-i}$: Force acting leftwardly to open the pilot poppet 44 for each state of the present valve 21 (i=1, 2, 3)

Consideration will now be made of the force acting on the pilot poppet 44 in the opening direction for each state of the relief action of a conventional valve, where $A'_R = A_P$, and also for the valve 21 of the present invention wherein $A_R$ alone is presumed to be made small to establish the relation $A_R < A_P$ for the sake of explanation.

The forces $F'_{p-1}$ and $F_{p-1}$ acting in the opening direction (leftward) on the pilot poppet 44 when the pilot poppet 44 is about to open or unseat during the relief action are as follows since $P_{1-1} = P_{2-1}$;

$$F'_{p-1} = A_P \cdot P_{2-1} \qquad F_{p-1} = A_P \cdot P_{2-1}$$
$$= A_P \cdot P_{1-1} \qquad \qquad = A_P \cdot P_{1-1}$$

They are the same, and an unseating pressure $P_C$ is also the same.

Next, the forces acting in the opening direction on the pilot poppet 44 during the period after unseating of the pilot poppet 44 until the piston poppet 37 is seated on the pilot poppet 44 are given by the following equations, respectively, because $P_{1-2} > P_{2-2}$;

$$F'_{p-2} = A_P \cdot P_{2-2}, \qquad F_{p-2} = A_P \cdot P_{2-2}$$

In addition, since $P_{2-2} > P_{2-1}$, the forces $F'_{p-2}$ and $F_{p-2}$ acting in the opening direction on the pilot poppet 44 become greater in comparison with the previous forces $F'_{p-1}$ and $F_{p-1}$, but the relation between $F'_{p-2}$ and $F_{p-2}$ in the conventional valve and the valve of the present invention remains unaltered.

However, the forces $F'_{p-3}$ acting in the opening direction on the pilot poppet 44 after the piston poppet 37 is seated on the pilot poppet 44 are given by the following equations, respectively;

$$F'_{p-3} = A'_R \cdot P_{1-3} + (A_P - A_B) \cdot P_{2-3} - (A'_R - A_B) \cdot P_{2-3} \quad (1)$$
$$= A'_R \cdot P_{1-3} \text{ where } [A_P = A'_R]$$

$$F_{p-3} = A_R \cdot P_{1-3} + (A_P - A_B) \cdot P_{2-3} - (A_R - A_B) \cdot P_{2-3} \quad (2)$$
$$= A_R \cdot P_{1-3} + (A_P - A_R) \cdot P_{2-3} \text{ where } [A_P > A_R]$$

Since $A'_R$ of the above formula (1) is the same as $[A_R + (A_P - A_R)]$ of the above formula (2) and at the same time, $P_{1-3} > P_{2-3}$, $$F'_{p-3} > F_{p-3}$$
$$\therefore F'_{p-3} - F'_{p-2} > F_{p-3} - F_{p-2}$$

Accordingly, in the conventional valve wherein the difference of forces "$F'_{p-3} - F'_{p-2}$" acting in the opening direction on the pilot poppet 44 immediately before or after the piston poppet 37 is seated on the pilot poppet 44, the pilot poppet 44 is forced wide open when the piston poppet 37 is seated so that the amount of oil or fluid flowing out of the back pressure chamber 39 increases while the inflow of oil into the back pressure chamber 39 through the bore 38 of the piston poppet 37 is cut off. In consequence, the pressure $P_{2-3}$ inside this back pressure chamber 39 drops drastically. Nevertheless, since the abovementioned formula (1) does not have the term $P_{2-3}$, the pilot poppet 44 is unable to respond to the change in $P_{2-3}$ so that the pilot poppet 44 is moved in the closing direction along with the pressure drop of $P_{2-3}$, and the excessive drop of $P_{2-3}$ can not be controlled. Moreover, the opening of the pilot poppet 44 is determined solely by the pressure $P_{1-3}$ inside the passageway 24 and this very opening of the pilot poppet 44 in turn determines the pressure $P_{2-3}$ inside the back pressure chamber 39. Accordingly during the transient period where the pressure $P_{1-3}$ in the passageway 24 is especially apt to fluctuate, $P_{2-3}$ also exhibits remarkable fluctuation along with fluctuation of the pressure $P_{1-3}$.

In comparison with the conventional valve, in the valve 21 of the present invention wherein the value $F_{p-3} - F_{p-2}$ is smaller, the amount of opening of the pilot poppet 44 is smaller than in the conventional valve at the time when the piston poppet 37 is seated on the pilot poppet 44. Thus, the amount of drop of the pressure $P_{2-3}$ in the back pressure chamber 39 is smaller in the valve 21 of the present invention than in the conventional valve. Furthermore, as can be understood from the above two equations, the pressure $P_{2-3}$ inside the back pressure chamber 39 contributes to the force $F_{p-3}$ acting in the opening direction on the pilot poppet 44 even after the seating of the piston poppet 37 so that it becomes possible to lower the fluctuation of the pressure $P_{2-3}$ inside the back pressure chamber 39 while adjusting the opening of the pilot poppet 44 in response to the change of $P_{2-3}$.

The relief poppet 31 is opened due to the pressure difference $P_{1-3} - P_{2-3}$ between the passageway 24 and the back pressure chamber 39 as explained above. In the conventional valve which is unable to control excessive drop in the pressure $P_{2-3}$ and fluctuation while controlling the opening of the pilot poppet 44 in response to the drop in the pressure $P_{2-3}$ inside the back pressure chamber 39 after the piston poppet 37 is seated on the pilot poppet 44, the excessive drop of $P_{2-3}$ causes excessive opening of the relief poppet 31 so that $P_{1-3}$ drops excessively below the unseating pressure $P_c$ of the pilot poppet 44. In consequence, the pilot poppet 44 is caused to close and actuates the relief poppet 31 in the closing direction while elevating the pressure $P_{1-3}$. Next, along with elevation of $P_{1-3}$, the pilot poppet 44 is opened and actuates the relief poppet 31 in the opening direction, thereby lowering the pressure $P_{1-3}$. While repeating the sequence of the above operations, the pilot poppet 44 stabilizes the opening of the relief poppet 31 to a suitable value in response to the change in $P_{1-3}$. Thus, a long period of time is required in the conventional valve before the pressure in the passageway 24 is stabilized to the set value. In addition, during this transient period, $P_{2-3}$ is apt to fluctuate remarkably so that the pressure $P_{1-3}$ inside the passageway 24, which is subject to control by the relief poppet 31 under the influence of $P_{2-3}$, also fluctuates remarkably, resulting in inferior transient characteristics.

In this connection, since the pressure $P_{2-3}$ inside the back pressure chamber 39 takes part in the opening of the pilot poppet 44 even after the piston poppet 37 is seated in the valve 21 of the present invention, it is possible in the present invention to minimize the change between the forces $F_{p-2}$ and $F_{p-3}$ acting in the opening direction on the pilot poppet 44 before or after the piston poppet 37 is seated on the pilot poppet 44, thereby reducing the drop of the pressure $P_{2-3}$ inside the back pressure chamber 39 after seating of the piston poppet 37. In this manner, it is also possible to prevent excessive opening of the relief poppet 31 and thus to prevent the pressure $P_{1-3}$ inside passageway 24 from dropping substantially below the unseating pressure $P_c$ of the pilot poppet 44. Accordingly, it becomes possible to shorten the time required before the pressure inside the passageway 24 is stabilized to the set value, thereby improving the stability of the function of the valve 21 as a relief valve. Since the resistance to the pilot flow is positively changed by the pilot poppet 44 in response to the change in the pressure $P_{2-3}$, fluctuation of the pressure $P_{1-3}$ inside the passageway 24 can also be reduced thereby to improve the transient characteristics.

According to experiments carried out by the present inventors, it has been found that preferred results are obtained by making the ratio $A_P/A_R$ between the sectional area $A_R$ of the piston poppet 37 and the area $A_p$ of the seat 45 for the pilot poppet 44 as large as possible. However, improvement in the transient characteristics and stability of the relief valve can be obtained by setting the ratio such that $A_P/A_R \geq 1.1$.

As described in the foregoing paragraph, the present invention provides the advantage of remarkable improvement in the transient characteristics and stability in relief pressure control by employing an extremely simple construction wherein the area ratio between the piston poppet 37 and the pilot poppet 44 seat 45 is set so as to satisfy the relationship $A_P/A_R \geq 1.1$.

FIGS. 4 to 10 are graphs of the transient characteristics in a relief pressure control valve in accordance with theoretical calculations.

Figure 4:
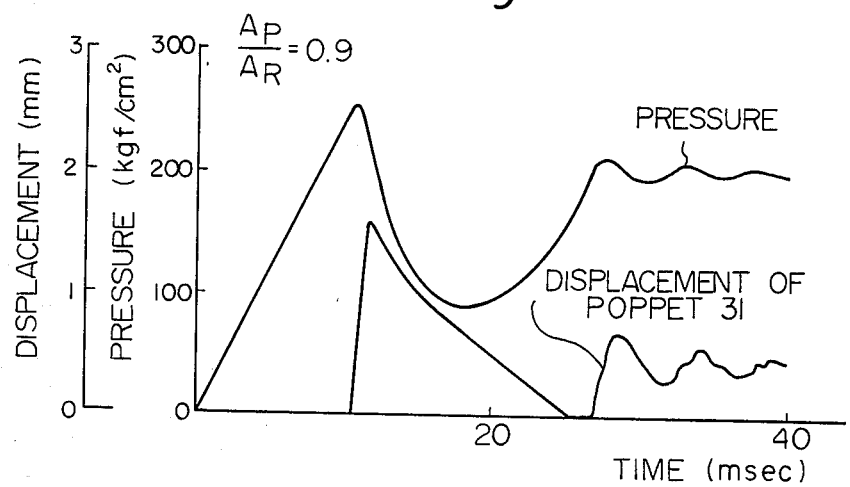
FIGS. 4 to 10 are graphs illustrating the principle of the present invention.
Figure 5:
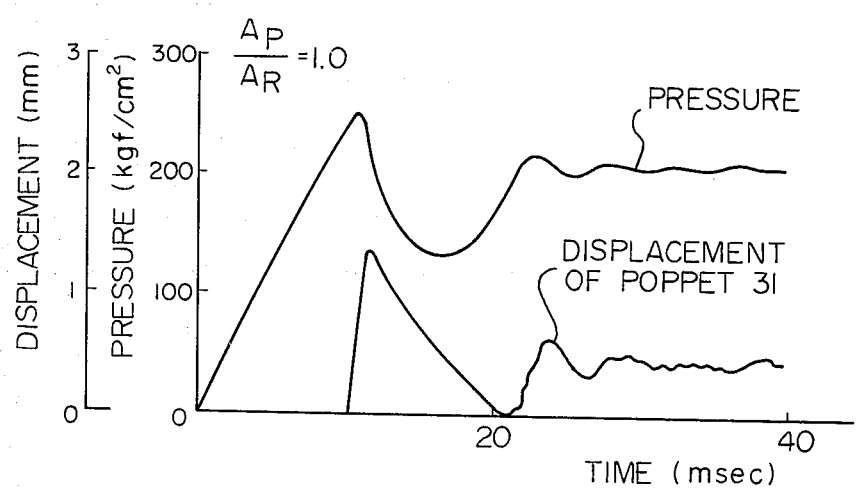
Figure 6:
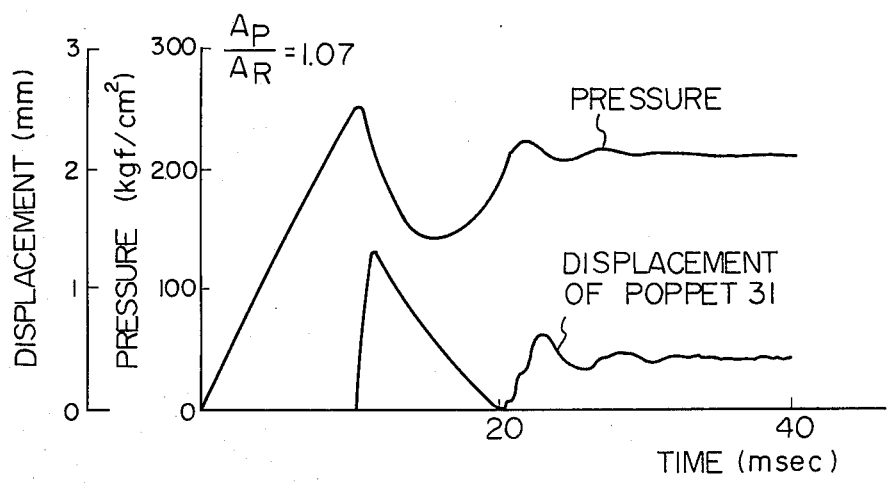
Figure 7:
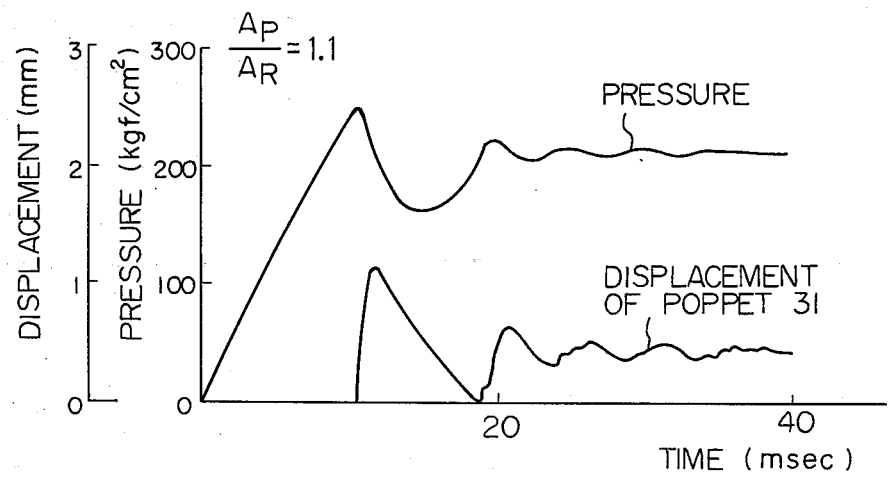

As shown in FIGS. 4 and 5, where $A_P/A_R \leq 1.0$, the pressure fluctuates or drops drastically after the peak pressure in the period of transition since the pressure in the back pressure chamber 39 is not controlled by the pilot poppet 44.

As shown in FIGS. 6 to 9, where $A_P/A_R > 1.0$, since the pressure in the back pressure chamber 39 is controlled by the pilot poppet 44, the transient characteristics are improved in such a manner that the pressure fluctuation or drop is decreased as the ratio $A_P/A_R$ is increased.

The drastic or sudden drop or fluctuation in pressure in the period of transition is caused by the excessive opening or displacement of the relief poppet 31, as described above. The operation of the relief poppet 31 is carried out in accordance with the pressure difference between the pressures in the passageway 24 and the back pressure chamber 39.

Accordingly, where $A_P/A_R \leq 1.0$, no pressure is applied to the relief poppet 31 since the pilot poppet 44 does not control the pressure in the back pressure chamber 39. In other words, the relief poppet 31 is not braked. Thus, the relief poppet 31 is rapidly moved or displaced. As a result, the relief poppet 31 opens too much. On the other hand, in the present invention, the operation of the relief poppet 31 is controlled so as to be properly moved or displaced since the pilot poppet 44 controls the pressure in the back pressure chamber 39. The specific relationship between the speed of movement or displacement of the relief poppet 31 and the ratio of $A_P/A_R$ is illustrated in FIG. 10.

Figure 10:
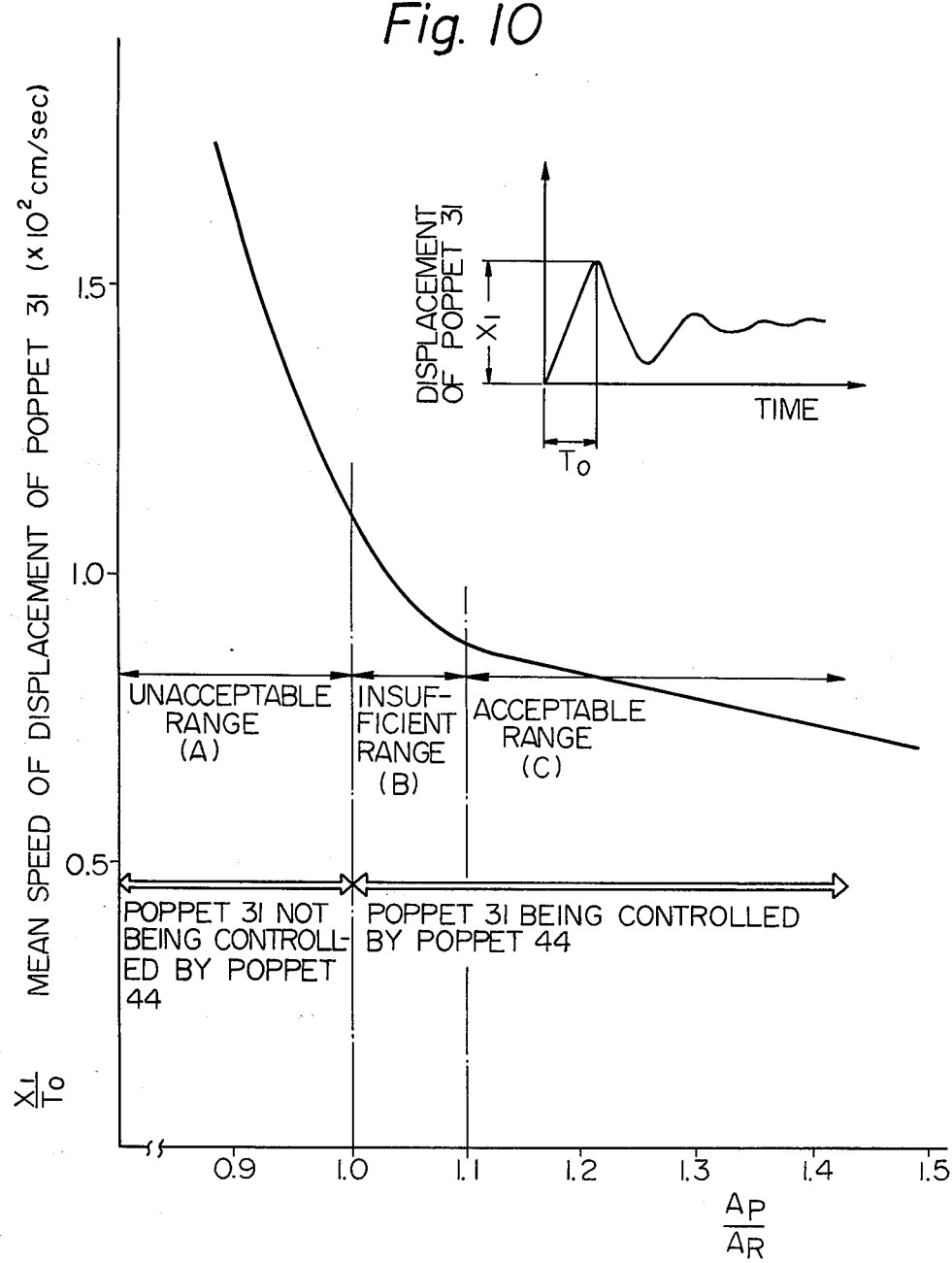

As shown in FIG. 10, the opening or displacement speed of the relief poppet 31 is exponentially decreased relative to the ratio $A_P/A_R$ in the ranges (A) and (B). In more detail, since the relief poppet 31 is not controlled by the pilot poppet 44 in the range (A), the relief poppet 31 is opened or displaced at very high speed. On the other hand, although the relief poppet 31 is somewhat controlled by the pilot poppet 44 in the range (B), the control is not sufficient because the ratio of $A_P/A_R$ is small, that is, below the value 1.1.

In the range (C), the opening or displacement speed of the relief poppet 31 is linearly and gradually decreased relative to the ratio $A_P/A_R$. In other words, the speed of the poppet 31 is gradually decreased relative to the large increase in the ratio $A_P/A_R$. In this range, the operation of the relief poppet 31 is sufficiently controlled by the pilot poppet 44.

It will be understood that the operation of the relief poppet 31 is considerably changed at the point of intersection of the curves in the ranges (B) and (C) in FIG.

10, that is, where $A_P/A_R=1.1$. It is thus noted that the critical value of $A_P/A_R$ is 1.1.

Figure 8:
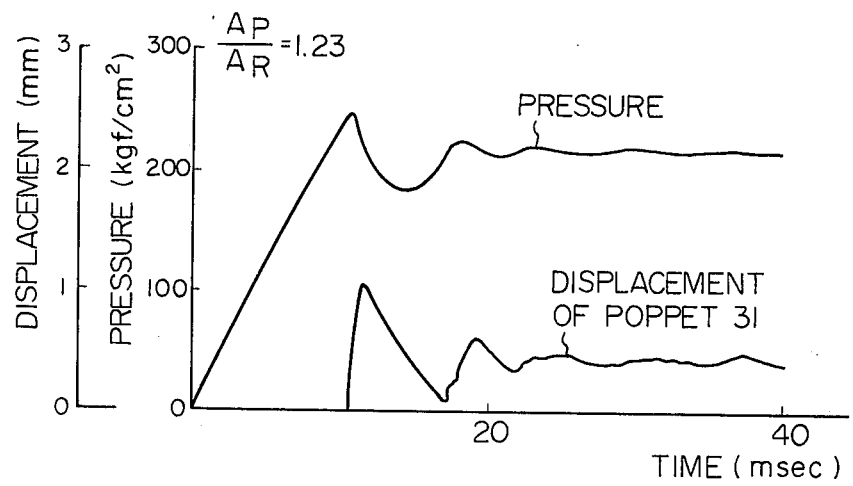
Figure 9:
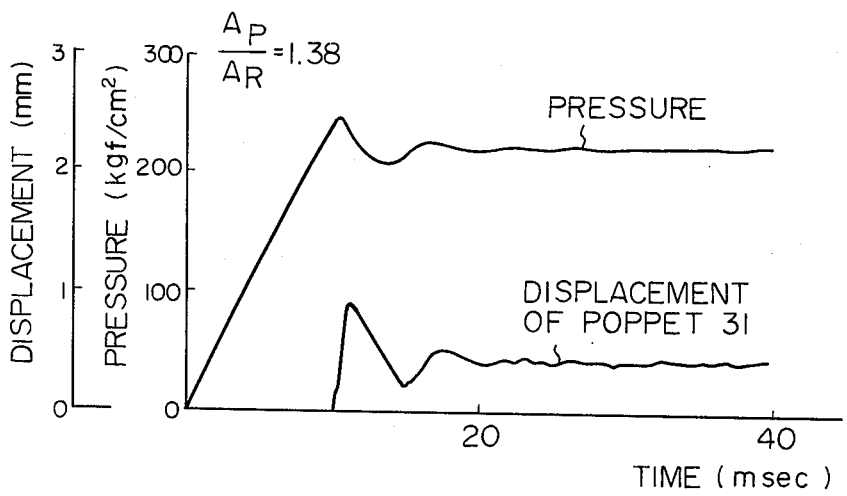

Accordingly, as shown in FIGS. 8 and 9, where $A_P/A_R \geq 1.1$, the desired transient characteristics of the relief pressure control valve to which the present invention relates are obtained.

FIGS. 11 to 14 are graphs of the transient characteristics of the relief pressure control valve on the basis of experiments conducted by the inventors.

Figure 11:
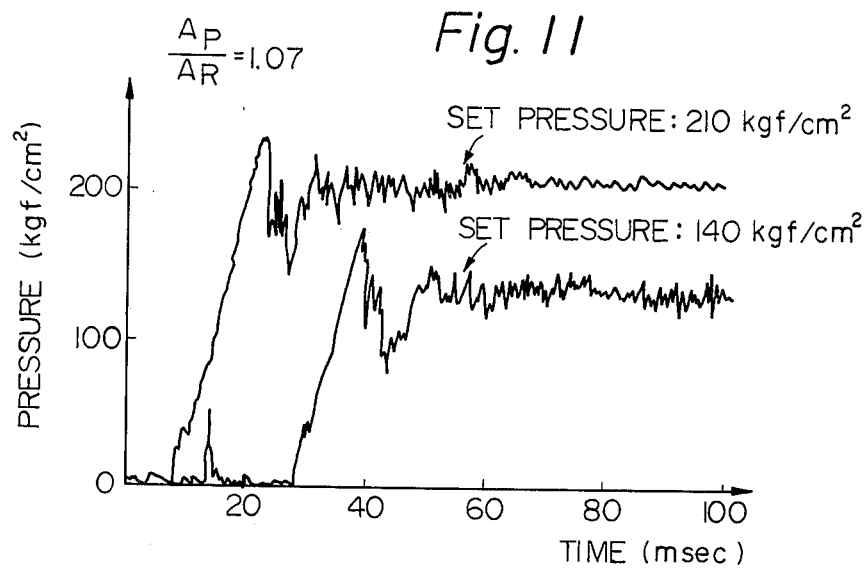
FIGS. 11 to 14 are graphs illustrating the performance of the present invention.
Figure 12:
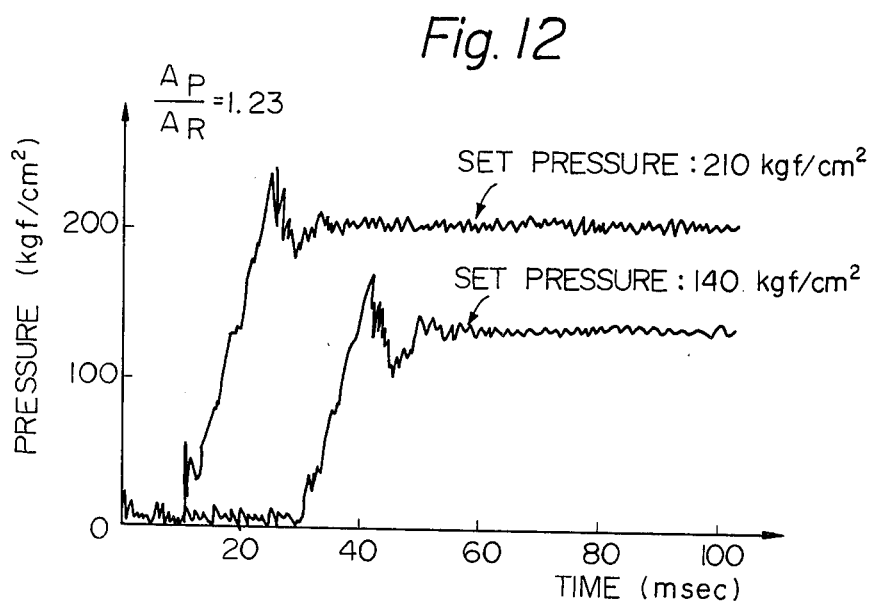
Figure 13:
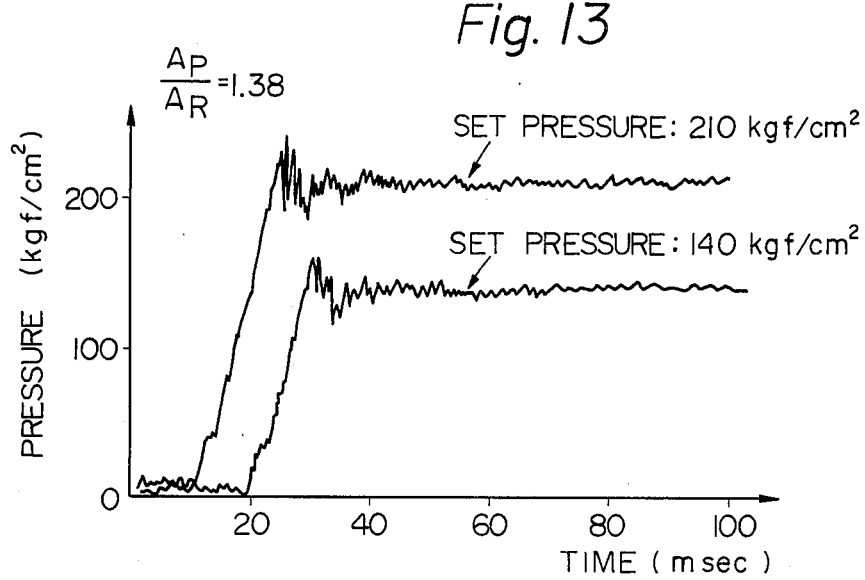
Figure 14:
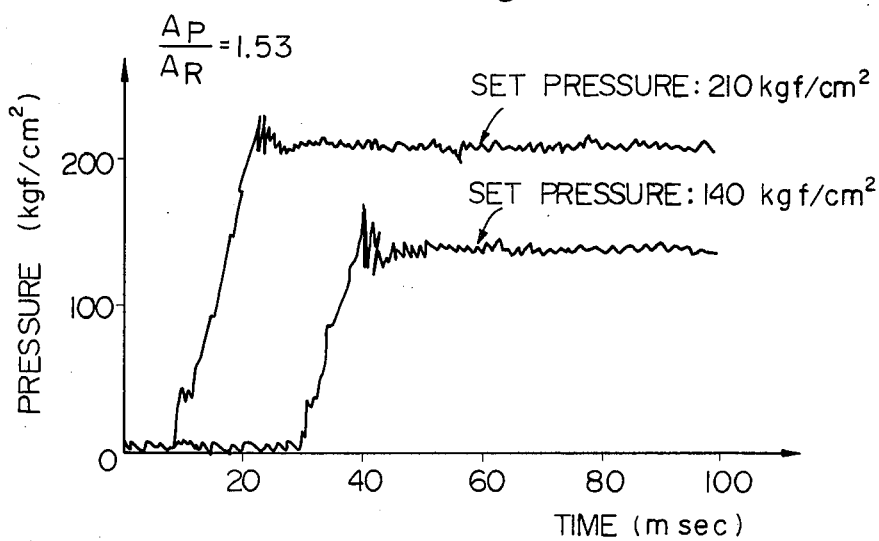

As shown in FIG. 11, where $A_P/A_R=1.07$ ($<1.1$), since the relief poppet 31 is not controlled by the pilot poppet 44, the pressure fluctuation or drop in the period of the transition is considerably large and sufficient pressure control is not obtained. On the other hand, as shown in FIGS. 12 to 14, where $A_P/A_R=1.23, 1.38$ and 1.53 (all being larger than 1.1), since the pressure in the back pressure chamber 39 is controlled by the pilot poppet 44, the pressure fluctuation or drop is properly reduced in the period of transition, resulting in the desired pressure control in the control valve of the present invention.

In summary, it will be seen that the present invention overcomes the drawbacks of the prior art and provides a pressure control valve with improved accuracy and stalibization. Various modifications will become possible for those skilled in the art after receiving the teachings of the present disclosure without departing from the scope thereof.

What is claimed is:

1. A pressure control valve including:
a housing defining a pressure port, a relief port and a back pressure chamber;
a relief poppet biased to block communication between the pressure port and the relief port, a first end of the relief poppet communicating with the pressure port and a second end of the relief poppet communicating with the back pressure chamber;
a piston poppet formed with a bore and slidably extending through the relief poppet; and
a pilot poppet biased to block communication between the back pressure chamber and the relief port, the pilot poppet being moved when a pressure in the back pressure chamber is above a biasing force to unblock communication between the back pressure chamber and the relief port, the piston poppet being moved by a pressure difference between the pressure port and the back pressure chamber to abut against the pilot poppet and seal the bore, the relief poppet being moved by said pressure difference to unblock communication between the pressure port and the relief port;
the pressure control valve being characterized in that $A_P/A_R \geq 1.1$ where $A_R$ is an area of the piston poppet exposed to pressure in the pressure port and $A_P$ is an area of the pilot poppet exposed to pressure in the back pressure chamber.

2. A control valve as in claim 1, in which an area of the relief poppet exposed to pressure in the pressure port is smaller than an area of the relief poppet exposed to pressure in the back pressure chamber, thereby biasing the relief poppet to block communication between the pressure port and the relief port.

3. A control valve as in claim 1, further comprising a spring for biasing the pilot poppet to block communication between the back pressure chamber and the relief port.

4. A control valve as in claim 1, further comprising a check poppet for unblocking communication between the pressure port and the relief port when the pressure in the pressure port is below a predetermined value.

5. A control valve as in claim 4, in which the check poppet has a first area exposed to pressure in the pressure port and a second area exposed to pressure in the relief port.

* * * * *